United States Patent [19]

Karouby

[11] Patent Number: 5,373,298
[45] Date of Patent: Dec. 13, 1994

[54] METHOD OF ESTIMATING THE ERROR IN THE CALCULATION OF THE POSITION OF A MOBILE BY A GPS RECEIVER, AND GPS RECEIVER FOR IMPLEMENTING THIS METHOD

[75] Inventor: Philippe Karouby, Toulouse, France

[73] Assignee: Alcatel Espace, Courbevoie, France

[21] Appl. No.: 131,733

[22] Filed: Oct. 5, 1993

[30] Foreign Application Priority Data

Oct. 8, 1992 [FR] France ................... 92 11960

[51] Int. Cl.[5] .................. H04B 7/185; G01S 5/02
[52] U.S. Cl. ........................ 342/357; 455/12.1
[58] Field of Search ............... 342/357; 455/12.1

[56] References Cited

PUBLICATIONS

Patent Abstracts of Japan, vol. 13, No. 209 (P-871) May 17, 1989 & JP-A-10 26 177 (Furuno Electric Co Ltd) Jul. 21, 1989.
IEEE Plans '88 Position Location and Navigation Symposium, No. 29—Dec. 2, 1988, Kissemmee, Fla., US; Cariveau et al.: "Satellite Data Management in DoD Navstar GPS Receivers", pp. 134–144.
Navigation: Journal of the Institute of Navigation, vol. 25, No. 2, Summer 1978, US., Milliken et al: "Principle of Operation of NAVSTAR and System Characteristics", pp. 95–106.
Proceedings of the IEEE, vol. 71, No. 10, Oct. 1983, New York, US; Parkinson et al: "NAVSTAR: Global Positioning System-Ten Years Later", pp. 1177–1186.
Toute L'Electronique, No. 511, Feb. 1986, Paris, France; "Navigation et positionnement par satellite: le systeme Navstar-GPS", pp. 54–62.

Primary Examiner—Theodore M. Blum
Attorney, Agent, or Firm—Sughrue, Mion, Zinn, Macpeak & Seas

[57] ABSTRACT

In a method of calculation by a GPS receiver of the position of a mobile in space and time relative to a predetermined frame of reference, the position is calculated from data supplied by at least four GPS satellites selected by the GPS receiver to form a calculation constellation. The method includes the step of estimating the error in the position calculation. This error is estimated by the GPS receiver for each calculated position. The estimated error therefore varies with the position of the mobile.

14 Claims, 2 Drawing Sheets

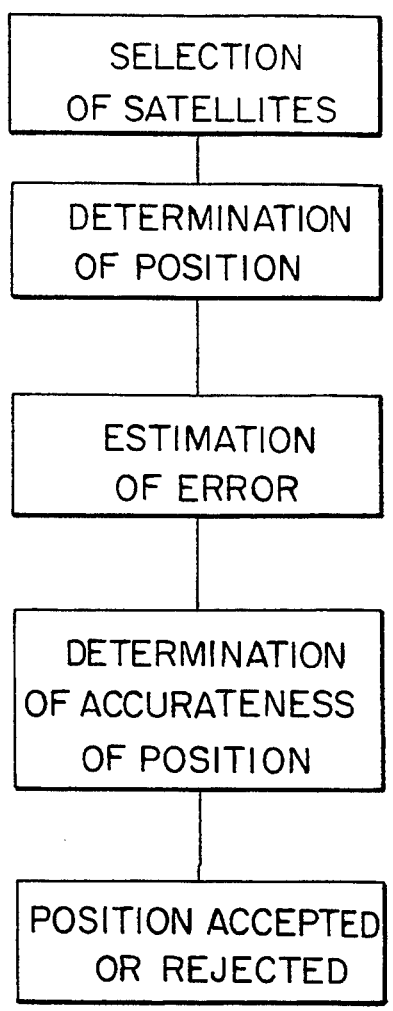

METHOD OF ESTIMATING THE ERROR IN THE CALCULATION OF THE POSITION OF A MOBILE BY A GPS RECEIVER, AND GPS RECEIVER FOR IMPLEMENTING THIS METHOD

BACKGROUND OF THE INVENTION

1. Field of the Invention

The present invention concerns a method of estimating the error occurring in the calculation of the spatial and temporal position of a mobile by a GPS (Global Positioning System) receiver.

2. Description of the Prior Art

The Global Positioning System is a well-known system for determining from the positions of a number of satellites, known at all times, the spatial and temporal position of a mobile provided with a GPS receiver capable of receiving and processing data from the satellites of the system which comprises 18 satellites in orbits such that most of the surface of the Earth can be "seen" by at least four satellites. At present up to nine satellites are used to determine the position of a mobile on the Earth but only four satellites are needed to determine the position of the mobile in time and in space in terms of four variables: x, y and z, the spatial coordinates of the mobile in a predetermined frame of reference, and its temporal coordinate (i.e. the date at which the mobile is at the calculated position, this date being specified in universal time).

The GPS receiver associated with a mobile includes means for:
 selecting a set of four (or more) satellites visible from the point at which the mobile is located, and
 calculating the position of the mobile in time and space from data supplied by the selected satellites.

The conventional GPS system offers 95% probability of a maximum error of 100 meters in the calculated horizontal position and 157 meters in the calculated vertical position. In other words, there is a 95% probability that the error in the horizontal position is 100 meters or less and the error in the vertical position is 157 meters or less. The GPS system guarantees a global accuracy which is a system constant.

A specific criterion for selecting the four satellites to be used by the GPS receiver to calculate the position of the mobile is used to select from all constellations (i.e. all sets) of four possible satellites from all the satellites in view that which can yield the guaranteed global accuracy of the GPS system in calculating the position of the mobile. This criterion C is proportional to $\sqrt{Tr[(A^T.A)^{-1}]}$, where:

A is the matrix:

$$A = \begin{pmatrix} \alpha_{11} & \alpha_{12} & \alpha_{13} & 1 \\ \alpha_{21} & \alpha_{22} & \alpha_{23} & 1 \\ \alpha_{31} & \alpha_{32} & \alpha_{33} & 1 \\ \alpha_{41} & \alpha_{42} & \alpha_{43} & 1 \end{pmatrix},$$

$\alpha_{ij}$, for i varying between 1 and 4 and j varying between 1 and 3, being the direction cosine of the angle between the jth coordinate axis and the straight line segment joining the mobile to the ith satellite and the subscripts 1, 2 and 3 being respectively associated with the abscissa, ordinate and third (z) axes, and Tr is the trace of the matrix $(A^T.A)^{-1}$ i.e. the sum of its diagonal elements, $A^T$ is the transpose of the matrix A and $(A^T.A)^{-1}$ is the inverse of the matrix $A^T.A$.

The coefficient of proportionality used to calculate C allows for all margins of inaccuracy of the GPS system. This constant coefficient therefore has a very high value for obvious reasons of security.

The criterion C is associated with a tolerance threshold and if this threshold is exceeded it is assumed that the corresponding constellation cannot guarantee the global accuracy; the GPS receiver then selects another constellation of four satellites and this process is repeated until the constellation yields an acceptable value of C.

Given the high value of the proportionality coefficient the criterion C is systematically penalized, i.e. a constellation may be rejected because it does not satisfy the global criterion C although in practise the accuracy with which it would enable the specific position to be calculated would be acceptable.

In some applications, for example construction of tunnels, installation of satellite antennas, sporting events and recreational sailing, for example, the GPS receiver can calculate the position of the mobile by integration over very long time periods so that the effects of the various sources of noise are minimized and the position finally calculated has an accuracy greater than the global accuracy guaranteed by the GPS system.

This is not possible in other applications, especially civil aviation. In this case it is not possible to wait for the system to integrate over a long time period. The accuracy achieved is then the guaranteed global accuracy, which is insufficient in the field of aviation. Likewise, the 5% inaccuracy is obviously intolerable in this field.

Consequently, given the hazards that it entails, the conventional GPS system is currently restricted to use in applications such that there is no great penalty in calculating the position of the mobile by integration over very long time periods.

The use of the criterion C is thus not only too constraining and penalizing but also insufficiently precise in many applications.

In military applications the GPS system uses a different transmission frequency than the conventional system. The data transmitted is encoded and cannot be decoded by a civilian user who does not have the appropriate decoder. In military applications the GPS system guarantees to a 95% probability a maximum error of 30 meters in all three dimensions. The criterion C employed is the same.

The guaranteed global accuracy and the use of the criterion C raise the same problems in military applications as use of the GPS system in civil applications.

Consideration might be given to estimating the error in the calculation of the position of the mobile by the GPS receiver. A method of this kind is described in the patent application JP-1 026 177, for example. The estimated measurement error, dependent on the calculated position, is obtained by multiplying the latter by a coefficient representing the degradation of the geometrical precision obtained with the GPS system (called GDOP, HDOP or PDOP in this system).

This coefficient is characteristic of the global inaccuracy margins of the GPS system. The error estimated by this method is therefore still a global error which is unsatisfactory in many applications and raises the same problems as the criterion C.

One object of the present invention is therefore to provide a method of supplying a conventional GPS system user with an estimate of the error in the calculated position which is more accurate than that produced by the prior art method.

Another object of the present invention is to enable more refined selection of the constellation of satellites to be used in calculating the position of a mobile.

SUMMARY OF THE INVENTION

The present invention consists in a method of estimating the error in the calculation by a GPS receiver carried by a mobile of the spatial and temporal position of said mobile in a predetermined frame of reference in which x, y and z are respectively the abscissa, ordinate and third coordinate of said position and t is the date in universal time at which said mobile is at the position (x, y, z), said position being calculated from data supplied by at least four GPS satellites selected by said GPS receiver to form a calculation constellation, said estimate of the error being represented by a vector $\epsilon$ whose components are respectively the estimated error on the abscissa dx, the estimated error on the ordinate dy, the estimated error on the third coordinate dz and the estimated time error c.dt where c is the speed of light in vacuum, said estimate being effected by said GPS receiver for each calculated position and $\epsilon$ being given by the equation:

$$\epsilon_r = K.\epsilon$$

where:

K is a matrix with N rows and four columns where N is the number of satellites in said constellation such that:

$$K = \begin{pmatrix} \alpha_{11} & \alpha_{11} & \alpha_{13} & 1 \\ \alpha_{21} & \alpha_{11} & \alpha_{23} & 1 \\ . & . & . & . \\ . & . & . & . \\ . & . & . & . \\ \alpha_{N1} & \alpha_{N2} & \alpha_{N3} & 1 \end{pmatrix}$$

$\alpha_{ij}$ for i varying from 1 through N and j varying from 1 through 3 being the direction cosine of the angle between the jth coordinate axis and the straight line segment joining said mobile to the ith satellite of said constellation, the subscripts 1, 2 and 3 being respectively associated with the abscissa, ordinate and third axes, $\epsilon_r$ is a vector with N components $URE_1$ through $URE_N$ where $URE_i$ for i varying from 1 through N is a datum supplied by said ith satellite giving the mean radial error between the theoretical position of said satellite and its actual position on the straight line segment joining said ith satellite to a point in the geographical area on the Earth seen by said ith satellite, the mean being calculated at the points of said geographical area at which a GPS ground station is located.

The solution provided by the invention is based on the observation that the URE (User Range Error) supplied regularly by the GPS system can be used to evaluate the error in each position calculation. By weighting the vector $\epsilon_r$ by the matrix K the best estimate of the error in the position calculation is obtained.

The method in accordance with the invention can produce an estimate of the accuracy of the calculated position that is no longer global but rather associated with a relatively small geographical area so that the estimated error may be deemed to be equal to the actual error in the calculated position.

The error in each position calculation is estimated. This enables the user to accept or reject the calculated position depending on whether the error in calculating this position as estimated by the method of the invention is above or below a predetermined tolerance threshold, for example.

The constellation highly advantageously comprises at most all of the GPS satellites visible from the mobile.

The greater the number of satellites used in the calculation the greater the reliability of the results produced by the method in accordance with the invention.

If N is greater than 4, solving the above equation by the least squares method yields the following solution giving the best estimate E of $\epsilon$:

$$E = (K_T.K)^{-1}.K^T.\epsilon_r.$$

To provide the user with a criterion that is easy to use, the method in accordance with the invention may further comprise the following operations:

a precision P is calculated from the components of $\epsilon$ by the equation:

$$P = \sqrt{dx^2 + dy^2 + dz^2 + (c \cdot dt)^2} \ ,$$

P is compared with a predetermined tolerance threshold, and said GPS receiver selects another constellation if P is above said threshold.

If E is used instead of $\epsilon$, the terms in $\epsilon$ are replaced by the terms in E in the calculation of P.

The invention also consists in a GPS receiver adapted to implement the method as defined above.

Other features and advantages of the present invention will emerge from the following description given by way of non-limiting illustrative example only.

BRIEF DESCRIPTION OF THE DRAWINGS

FIG. 2 is a flowchart illustrating steps of the method invention.

DETAILED DESCRIPTION OF THE INVENTION

Figure 1:
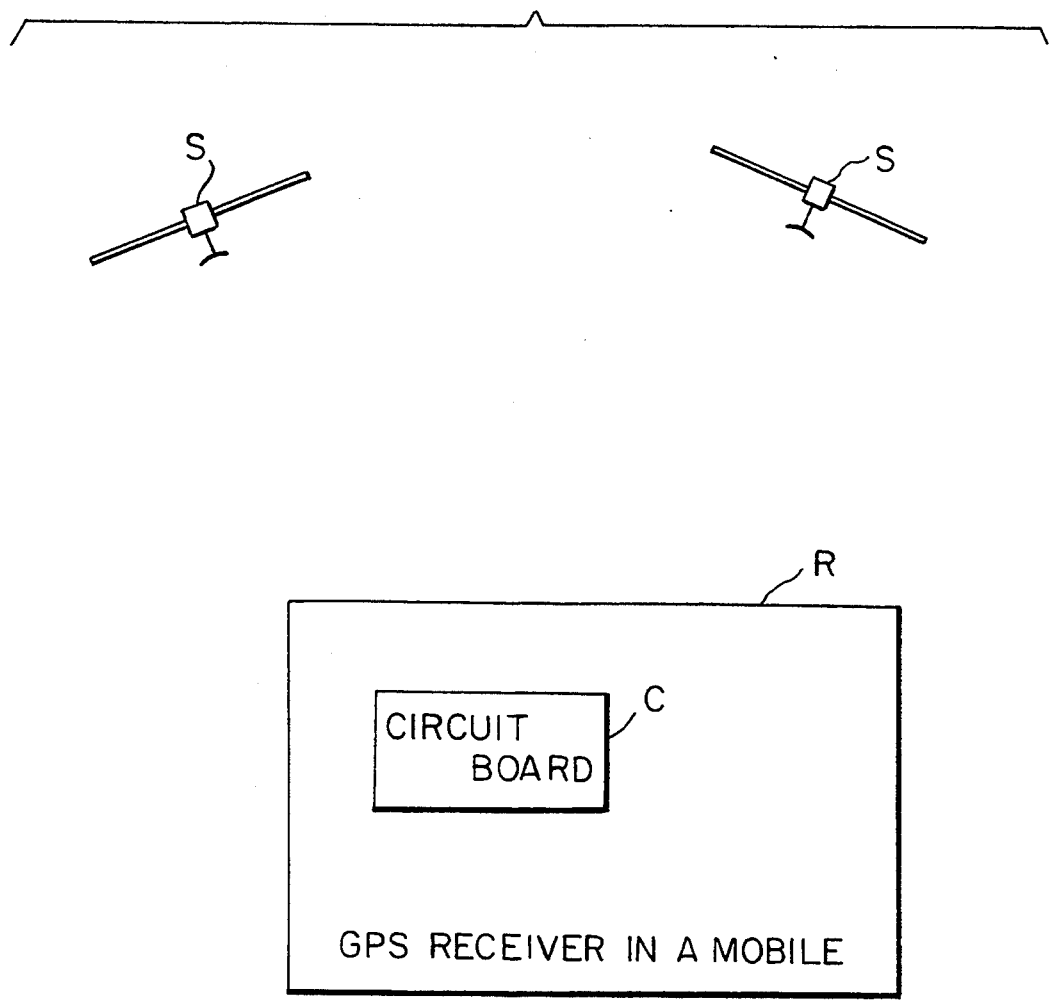
FIG. 1 shows in a highly schematic form the component parts of a GPS receiver used to implement the method in accordance with the invention.

It is possible to obtain by theoretical means an equation including the vector e representing the error in the calculated position and whose components are respectively the abscissa error, the ordinate error, the third coordinate error and the time error. This equation is:

$$\delta_r = A.e \qquad (1),$$

where $\delta_r$ is a vector with four components $\Delta R_1$ through $\Delta R_4$. $\Delta R_i$ for i varying from 1 through 4 is a theoretical bias. Equation (1) is used conventionally to prove that the criterion C is sufficient to guarantee the global accuracy in respect of the calculated position.

Consideration could be given to using this equation to implement the method of the invention to determine the exact error in the position calculation. However, the bias $\Delta R_i$ is a theoretical datum which does not exist in reality in the GPS system. This theoretical data corresponds to the mean radial errors in the distance between each point on the Earth and the satellite in question. This obviously cannot be calculated.

The preferred embodiment of the present invention is based on the fact that, to obtain a good estimate of the vector e, it is possible in equation (1) to replace $\Delta R_i$ by data $URE_i$ whose origin and advantages will now be described.

In the GPS system each satellite has an associated URE (User Range Error) value. To determine the URE relating to a given satellite all relay stations on the ground with the satellite in view calculate the radial error, i.e. the error on the ground station to satellite line between the actual position of the satellite and its theoretical position (i.e. its position as calculated before launch). This is possible because each ground station knows its own position exactly. Each ground station therefore has its position calculated by the satellites of the system and deduces their actual position from the difference between its position as calculated and its exact position. The URE is then calculated as the mean of the radial errors determined by all the ground stations which have the satellite in question in view.

The URE is a physical reality in the GPS system. It is consequently accessible to the GPS receiver. It varies with time and with the geographical area in which the mobile is located.

The URE values are calculated and uploaded regularly into the satellites by the ground stations so that they change as the satellites drift.

Finally, each satellite is assigned a bias enabling the GPS receiver to estimate and take account of changes in the URE between two uploadings from the ground station.

Calculation with $\Delta R_i$ replaced by $URE_i$ in equation (1) provides a rigourous estimate of the vector e, as explained above.

To estimate e the GPS receiver begins by selecting a constellation of satellites in the same manner as described in the preamble, i.e. using the criterion C, possibly generalized to enable the use of N satellites (FIG. 1) where N is greater than or equal to 4 and less than or equal to the number of satellites that can be seen by the mobile.

If N is equal to 4 it is possible to calculate directly a vector $\epsilon$ whose components are the estimated error in the abscissa dx, the estimated error in the ordinate dy, the estimated error in the third coordinate dz and the estimated time error c.dt from the equation $\epsilon_r = K.\epsilon$, in which:

K is a matrix of N rows and four columns:

$$K = \begin{pmatrix} a_{11} & a_{11} & a_{13} & 1 \\ a_{21} & a_{11} & a_{23} & 1 \\ \cdot & \cdot & \cdot & \cdot \\ \cdot & \cdot & \cdot & \cdot \\ \cdot & \cdot & \cdot & \cdot \\ a_{N1} & a_{N2} & a_{N3} & 1 \end{pmatrix}$$

$a_{ij}$, for i varying from 1 through N and j varying from 1 through 3 being the direction cosine of the angle between the jth coordinate axis and the straight line segment joining the mobile to the ith satellite and the subscripts 1, 2 and 3 being respectively associated with the abscissa, ordinate and third coordinate axes, and $\epsilon_r$ is a vector with N components $URE_1$ through $URE_N$ where $URE_i$ varying from 1 through N is the value of the URE associated with the ith satellite.

If N is greater than 4 there are more equations than unknowns. The best estimate E of $\epsilon$ is then given by the following equation, using the least squares method:

$$E = (K^T.K)^{-1}.K^T.\epsilon_r,$$

in which $K^T$ is the transpose of the matrix K and $(K^T.K)^{-1}$ is the inverse of the matrix $(K^T.K)$.

In some applications the components Dx, Dy, Dz and c.Dt of E may be used directly. In this case a reference vector $E_{ref}$ is defined beforehand and by comparing the same ranked components of the vectors E and $E_{ref}$ it is possible either to retain the calculated position or to reject it if the differences between certain coordinates of E and $E_{ref}$ are too large.

It is preferable to compare the norms of the vectors E and $E_{ref}$. This calculates a precision P defined by the equation:

$$P = \sqrt{Dx^2 + Dy^2 + Dz^2 + (c \cdot Dt)^2},$$

where Dx, Dy, Dz and c.Dt are the components of E.

The above considerations regarding the calculation of P apply equally to replacing E by $\epsilon$ and Dx, Dy, Dz and c.Dt by dx, dy, dz and c.dt, respectively.

If P is above a threshold $P_{ref}$ determined beforehand on the basis of the required accuracy, the GPS receiver can indicate this to the user by means of a visual or audible alarm, for example. The result of comparing P and $P_{ref}$ can also be used to cause the program to be continued differently in the receiver, for example by generating a bit at 0 or at 1 depending on whether P is less than or greater than $P_{ref}$.

The invention therefore makes it possible to establish a simple and highly reliable criterion for rejecting the position calculated by the GPS receiver. If the calculated position is rejected the receiver can select another constellation and calculate the position again. If the accuracy is still insufficient the GPS receiver can select other constellations until the required accuracy is achieved.

In the case of applications in civil aviation the user can either accept the position calculated by the GPS receiver if the accuracy as determined by the invention is sufficient or reject this position in favor of a position determined by the inertial navigation system of the aircraft.

In applications where integration over long time periods is acceptable the invention can significantly shorten the calculation time, which is also highly advantageous.

Referring to the single figure of the accompanying drawing, the method in accordance with the invention may be implemented without difficulty on a circuit board C inside a GPS receiver R. The URE are obtained very easily from the message transmitted by each satellite of the constellation chosen by the receiver and E is calculated quickly because it entails only inverting a square matrix of the ninth or tenth order maximum and calculating products of matrices.

Of course, the invention is not limited to the embodiment that has just been described and any means may be replaced by equivalent means without departing from the scope of the invention.

There is claimed:

1. A method of determining the spatial and temporal position of a global positioning system (GPS) receiver carried by a mobile in a GPS system including a plurality of GPS satellites, said method comprising the steps of:

receiving signals from at least four said GPS satellites selected by said receiver to form a calculation constellation;

processing the received signals to determine the spatial and temporal position of the GPS receiver in a predetermined frame of reference in which x, y and z are respectively the abscissa, ordinate and third coordinate of said position, and t is the date in universal time at which said receiver is at the position (x, y, z); and estimating an error between the determined position and an actual position of said receiver, said estimating step comprising the steps of representing the error by a vector $\epsilon$ whose components are respectively the estimated error on the abscissa dx, the estimated error on the ordinate dy, the estimated error on the third coordinate dz and the estimated time error c.dt where c is the speed of light in vacuum, effecting said estimate by said GPS receiver for each calculated position, e being given by the equation $$\epsilon_r = K.\epsilon$$

where:

K is a matrix with N rows and four columns, and N is the number of satellites in said constellation such that $$K = \begin{pmatrix} \alpha_{11} & \alpha_{11} & \alpha_{13} & 1 \\ \alpha_{21} & \alpha_{11} & \alpha_{23} & 1 \\ . & . & . & . \\ . & . & . & . \\ . & . & . & . \\ \alpha_{N1} & \alpha_{N2} & \alpha_{N3} & 1 \end{pmatrix},$$

$a_{ij}$ varying from 1 through N and j varying from 1 through 3 being the direction cosine of the angle between the jth coordinate axis and the straight line segment joining said mobile to the ith satellite of said constellation, the subscripts 1, 2 and 3 being respectively associated with the abscissa, ordinate and third coordinate axes, $\epsilon_r$ is a vector with N components $URE_1$ through $URE_N$ where $URE_i$ for i varying from 1 through N is a datum, supplied by said ith satellite, giving the mean radial error between the theoretical position of said ith satellite and its actual position on the straight line segment joining said ith satellite to a point in a geographical area on the Earth as seen by said ith satellite; and calculating the mean at the points of said geographical area at which a GPS ground station is located.

2. The method according to claim 1, further comprising the step of determining, by use of the estimated error and of a predetermined tolerance threshold, if the processed precision of the spatial and temporal position is acceptably accurate.

3. The method according to claim 2, further comprising the step of indicating that the processed spatial and temporal position is accepted if said estimated error is above said threshold, and rejected if it is below said threshold.

4. Method according to claim 1 wherein said constellation comprises at most all of the GPS satellites visible from said mobile.

5. Method according to claim 1 wherein if N is greater than 4 the best estimate E of $\epsilon$ is given by the equation:

$$E = (K^T.K)^{-1}.K^T.\epsilon_r$$

and E is used instead of $\epsilon$ by replacing the respective components dx, dy, dz and c.dt of $\epsilon$ by the components Dx, Dy, Dz and c.Dt of E.

6. Method according to claim 1 further comprising the following steps:

a precision P is calculated from the components of $\epsilon$ by the equation:

$$P = \sqrt{dx^2 + dy^2 + dz^2 + (c \cdot dt)^2},$$

P is compared with a predetermined tolerance threshold, and said GPS receiver selects another constellation if P is above said threshold.

7. Method according to claim 1 further comprising the following steps:

a precision P is calculated from the components of $\epsilon$ by the equation:

$$P = \sqrt{dx^2 + dy^2 + dz^2 + (c \cdot dt)^2},$$

P is compared with a predetermined tolerance threshold, and said GPS receiver indicates that said calculated position is to be rejected.

8. A GPS receiver adapted to implement a method of determining the spatial and temporal position of a global positioning system (GPS) receiver carried by a mobile in a GPS system including a plurality of GPS satellites, said method comprising the steps of:

receiving signals from at least four said GPS satellites selected by said receiver to form a calculation constellation;

processing the received signals to determine the spatial and temporal position of the GPS receiver in a predetermined frame of reference in which x, y and z are respectively the abscissa, ordinate and third coordinate of said position, and t is the date in universal time at which said receiver is at the position (x, y, z); and estimating an error between the determined position and an actual position of said receiver, said estimating step comprising the steps of representing the error by a vector $\epsilon$ whose components are respectively the estimated error on the abscissa dx, the estimated error on the ordinate dy, the estimated error on the third coordinate dz and the estimated time error c.dt where c is the speed of light in vacuum, effecting said estimate by said GPS receiver for each calculated position, $\epsilon$ being given by the equation $$\epsilon_r = K.\epsilon$$

where:

K is a matrix with N rows and four columns, and N is the number of satellites in said constellation such that $$K = \begin{pmatrix} \alpha_{11} & \alpha_{11} & \alpha_{13} & 1 \\ \alpha_{21} & \alpha_{11} & \alpha_{23} & 1 \\ . & . & . & . \\ . & . & . & . \\ . & . & . & . \\ \alpha_{N1} & \alpha_{N2} & \alpha_{N3} & 1 \end{pmatrix},$$

$a_{ij}$ for i varying from 1 through N and j varying from 1 through 3 being the direction cosine of the angle between the jth coordinate axis and the straight line segment joining said mobile to the ith satellite of said constellation, the subscripts 1, 2 and 3 being respectively associated with the abscissa, ordinate and third coordinate axes, $\epsilon_r$ is a vector with N components $URE_1$ through $URE_N$ where $URE_i$ for i varying from 1 through N is a datum, supplied by said ith satellite, giving the mean radial error between the theoretical position of said ith satellite and its actual position on the straight line segment joining said ith satellite to a point in a geographical area on the Earth as seen by said ith satellite; and calculating the mean at the points of said geographical area at which a GPS ground station is located.

9. Receiver according to claim 8 wherein said constellation comprises at most all of the GPS satellites visible from said mobile.

10. Receiver according to claim 8 wherein if N is greater than 4 the best estimate E of $\epsilon$ is given by the equation:

$$E = (K^T.K)^{-1}.K^T.\epsilon_r,$$

and E is used instead of $\epsilon$ by replacing the respective components dx, dy, dz and c.dt of $\epsilon$ by the components Dx, Dy, Dz and c.Dt of E.

11. Receiver according to claim 8 wherein:

a precision P is calculated from the components of $\epsilon$ by the equation:

$$P = \sqrt{dx^2 + dy^2 + dz^2 + (c \cdot dt)^2},$$

P is compared with a predetermined tolerance threshold, and said GPS receiver selects another constellation if P is above said threshold.

12. Receiver according to claim 8 wherein:

a precision P is calculated from the components of $\epsilon$ by the equation:

$$P = \sqrt{dx^2 + dy^2 + dz^2 + (c \cdot dt)^2},$$

P is compared with a predetermined tolerance threshold, and said GPS receiver indicates that said calculated position is to be rejected.

13. The receiver according to claim 8, wherein said GPS receiver determines, by use of the estimated error and of a predetermined tolerance threshold, if the processed precision of the spatial and temporal position is acceptably accurate.

14. The GPS receiver according to claim 13, wherein said receiver indicates that the processed spatial and temporal position is accepted if said estimated error is above said threshold, and rejected if it is below said threshold.

* * * * *